United States Patent Office 3,560,464
Patented Feb. 2, 1971

3,560,464
MELT-FORMABLE POLYVINYL ALCOHOLS
Kentaro Toyoshima, Saburo Imoto, Hirosaburo Mori,
Osamu Ohara, Hiroshi Harima, and Shunji Miyake,
Kurashiki-shi, and Taiji Ozaki, Takatsuki-shi, Japan,
assignors to Kuraray Co., Ltd., Okayama Prefecture,
Japan, a corporation of Japan
No Drawing. Filed Sept. 29, 1966, Ser. No. 583,077
Claims priority, application Japan, Oct. 11, 1965,
40/62,239
Int. Cl. C08f 3/34
U.S. Cl. 260—91.3                                  1 Claim

ABSTRACT OF THE DISCLOSURE

A method is disclosed by which polyvinyl alcohol moldings are formed. A polyvinyl alcohol having about 4 to 15 mol percent of side chain alkyl groups of about 4 to 20 carbon atoms, based on the total number of carbon atoms in the main polymer chain having substituents other than hydrogen, is melt extruded into a shaped product. The side chain may have the structure —OR,

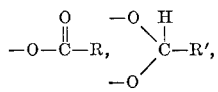

—R, wherein R and R' are alkyl.

This invention relates to the production of filaments, yarns, films, and other moldings or shapes of polyvinyl alcohol synthetic resins. More particularly, the invention is directed to the preparation of moldings of polyvinyl alcohol synthetic resins by the melting of certain modified polyvinyl alcohols and molding the melt into a shaped or formed material.

Since polyvinyl alcohols (hereinafter referred to as PVA) have melting points higher than their decomposition points, they are incapable of being extruded in molten state. Consequently, polyvinyl alcohols, heretofore, have been filmed or spun by a wet or dry process from aqueous solutions having concentrations of up to about 60% PVA. These conventional methods, however, cannot be deemed practical because very high calorific values and arrangements are required for solubilizing the PVA and evaporating the water content after forming or molding. In addition, long periods of time and special skill are necessary, particularly in the molding of thick-walled products such as sheets and pipes. Another method proposed for the molding of PVA consists of extruding in the presence of a plasticizer which is a polyvinyl alcohol obtained by replacing 75 to 90% of the acetyl groups in polyvinyl acetate with hydroxyl groups. This method has not been found commercially adaptable because of the very poor water resistance exhibited by the resulting products.

PVA films are also known to lose flexibility under low temperature and low humidity conditions. Thus, plasticizers such as glycerine, diethylene glycols, etc. are usually employed to prevent this flexibility loss. These plasticizers, however, are more or less volatile and cannot keep the products flexible for long periods of time. Moreover, if added in excess, the plasticizers may phase separate and cause tackiness or other problems. Thus, though polyvinyl alcohols have excellent resistance to organic solvents such as straight-chain hydrocarbons, branched-chain hydrocarbons, aromatic hydrocarbons, halogenated hydrocarbons and other organic compounds, they have not been used, for the reasons given above, in many applications which can otherwise take advantage of such properties.

The present invention overcomes the foregoing disadvantage of ordinary PVA and provides a method which achieves a remarkably increased production efficiency as compared to conventional methods of producing PVA moldings. Furthermore, the method of the invention improves the miscibility of glycerine, diethylene glycol and other common plasticizers with PVA and the flexibility of the molded products at low temperature and humidity conditions without adversely affecting the water resistance and the very high organic solvent resistance of PVA. In accordance with the present invention a PVA having a minor portion of alkyl groups of about 4 to 20 carbon atoms based on the total number of such alkyl groups and the hydroxyl groups of the modified PVA, is melted and formed while in the molten state in the absence or presence of a plasticizer. By molten state is meant the degree of melting that permits melt molding, e.g., extrusion of the PVA of the invention and includes lesser degrees of melting than complete melting.

The modified polyvinyl alcohols of the invention have about 1 to 15% of the designated alkyl side chains based on the total average number of carbon atoms of the main polymer chain having substituents other than hydrogen. The modified polymers employed in the present invention may be prepared by any procedure known to the art as, for instance, by saponification of a copolymer of vinyl acetate and higher alkyl vinyl ether, saponification of a copolymer of vinyl formate and higher alkyl vinyl ester, saponification of a copolymer of vinyl acetate and an α-olefin (e.g. octene-1, octadecene-1 or the like), and acetalation through reaction of polyvinyl alcohol with higher aldehyde. The modified polyvinyl alcohols can be represented by the molecular structure

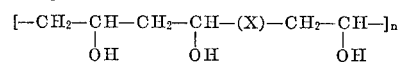

and in the formula, (X) denotes

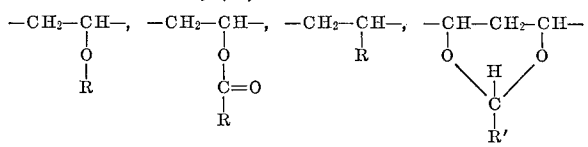

wherein R and R' are straight-chain or branched alkyl group having about 4 to 20 carbon atoms and n is 7 to 19. These modified PVA have the same actions and effects in the present invention regardless of the differences in the molecular structure. If n is less than 7 the water resistance of the resulting product is not sufficient and if the value is more than 19 the dynamical properties will be sacrificed. Therefore, n is preferably about 8 to 18.

The degree of substitution (X), noted above has been found to provide excellent resistance to organic solvents and at the same time favorably affects the water resistance and moldability of the product. A PVA having a substitution degree of less than about one molar percent fails to exhibit the desired characteristics, being little different from ordinary PVA. For acetalyzed products, a substitution degree of about 2 to 30 mol. percent in terms of substitution for the OH group is desirable because one higher aldehyde reacts with two vinyl alcohol units.

Of the modified polyvinyl alcohols, those having a substitution degree of more than about 4 mol. percent can be molded by extrusion in molten state at a temperature below the decomposition point of the polyvinyl alcohol, without the addition of a plasticizer. The melt extrusion, however, will be further facilitated by the use of a common plasticizer for PVA, such as glycerine, ethylene glycol, diethylene glycol, triethylene glycol, trimethylol propane, etc. The use of such plasticizers will permit molding at lower temperatures and production of softer and more flexible moldings. Triethylene glycol and higher molecular weight ethylene glycols in particular, give good miscibility and low plasticizer volatility. While an increase in the amount of plasticizer provided will make the molding operation easy, it is preferable that the amount of plasticizer be in the range of about 5 to 30% by weight, more preferably about 10 to 20% by weight in view of the water resistance and dynamical properties endowed the resulting product as well as the improved miscibility between the modified PVA and plasticizers that is obtained. In general, the greater the degree of substitution of the PVA with R or R' groups, the less the amount of plasticizer required.

Modified polyvinyl alcohols having substitution degrees of about 1 to 4 mol. percent may present difficulties in melt extrusion without a plasticizer, but, by the addition of more than about 5% plasticizer, they can be readily molded by extrusion in half molten state at a temperature below the decomposition point of PVA.

Contrary to the modified PVA of the present invention, polyvinyl alcohols having saponification degrees of more than 90 mol. percent and no long-chain alkyl side chain cannot be extruded if the plasticizer content is less than 50% because the melting temperature is higher than the decomposition temperature of the PVA or, even if melted, the viscosity of the melt will be too high. Moreover, the miscibility of the PVA with plasticizers is less than that of the modified polyvinyl alcohols of the invention.

It has been disclosed by the Journal of Polymer Science, 32, 33 (1958), that polyvinyl alcohols having long-chain alkyl side chains are to some extent plasticized internally. Further, a method of producing highly water-resistant modified PVA from a higher alkyl vinyl ether-vinyl acetate copolymer is described in Japanese patent publication No. 2,843/1961. However, the latter method is limited to formation of films by a wet or semi-dry process utilizing solvents such as hot phenol, dimethyl formamide, dimethyl sulfoxide, formamide, etc. because of the difficulties involved in melt extrusion. The method is not adapted for practical application as it needs additional steps of melting the copolymer and drying after molding. The modified PVA of the present invention, on the other hand, can be molded by an ordinary extruder with the polymer being in an anhydrous state and in the absence of organic solvents. Since no drying process is required, efficient molding is accomplished with obvious practical advantages. Although the addition of water or an organic solvent can be tolerated in the process of this invention, it is not necessary and economics will not favor such addition because it requires a drying process. If desired, fillers may be added to the modified PVA to be extruded in an amount of, for instance about 10 to 30% in order to save the cost of moldings. The fillers for the purpose of the invention include, by way of example, calcium carbonate, titanium oxide, carbon, etc.

The invention is further illustrated by the following examples which are not to be considered as limiting:

EXAMPLE 1

Four parts of $\alpha,\alpha'$-azobisisobutylonitrile (hereinafter referred to as AZN) was added as a polymerization catalyst to 2925 parts of vinyl acetate, 1075 parts of lauryl vinyl ether, and 301 parts of methanol, and the whole mixture was polymerized at 63 to 70° C. for 780 minutes. During the polymerization, a solution consisting of 1164 parts of vinyl acetate, 61 parts of methanol, and 1.16 parts of AZN was added gradually over a period of 570 minutes in order to homogenize the composition of the resulting polymer. Vinyl acetate was driven out of the paste obtained, and the paste was subjected to alkaline saponification with a methanol system, washed with methanol, and dried. A modified polyvinyl alcohol containing 4.7 mol percent of lauryl vinyl ether was obtained at a yield of 70%. A differential thermal analysis of the modified PVA showed a heat absorption peak corresponding to melting at 197° C., which was lower than the peak of ordinary PVA (234.9° C.) by about 38° C. This modified PVA, with the addition of 0.5% magnesium sulfate as an antioxidant, was molded thorugh a conventional extruder, while the feed zone was kept at 180° C. and the compression and metering zone at 210° C. The torsional rigidity of the extrusion thus obtained was compared in absolute dry state with an ordinary completely saponified product. The results, reported in Table 1, show that softness and flexibility of the extrusion increased in the entire temperature regions and the product was internally plasticized.

TABLE 1.—DYNAMIC TORSIONAL RIGIDITY OF EXTRUSIONS IN ABSOLUTELY DRY STATE (IN DYN./CM.²) (BY FREE VIBRATION METHOD)

| Temperature (° C.) | −40 | −20 | 0 | 20 | 40 | 60 |
|---|---|---|---|---|---|---|
| Modified PVA | $1.89 \times 10^{10}$ | $1.78 \times 10^{10}$ | $1.35 \times 10^{10}$ | $1.15 \times 10^{10}$ | $8.25 \times 10^{9}$ | $4.38 \times 10^{9}$ |
| PVA | $4.70 \times 10^{10}$ | $3.94 \times 10^{10}$ | $3.80 \times 10^{10}$ | $3.23 \times 10^{10}$ | $2.61 \times 10^{10}$ | $1.59 \times 10^{10}$ |

EXAMPLE 2

To 100 parts of a modified polyvinyl alcohol containing 4.7 mol. percent of lauryl vinyl ether was added 20 parts of filter glycerine (hereinafter referred to as G) or trimethylol propane (TMP). The mixture could be molded through an ordinary extruder, with the feed zone kept at 150° C. and the compression and metering zone at 200° C.

The dynamic torsional rigidity of the product thus obtained was determined in absolutely dry state. The results, summarized in Table 2, show that the product was far more flexible than that obtained according to Example 1.

TABLE 2.—DYNAMIC TORSIONAL RIGIDITY IN ABSOLUTELY DRY STATE (IN DYN./CM.²) (BY FREE VIBRATION METHOD)

| Temperature (° C.) | −40 | −20 | 0 | 20 | 40 | 60 |
|---|---|---|---|---|---|---|
| Modified PVA plus TMP | $2.35 \times 10^{10}$ | $2.00 \times 10^{10}$ | $1.59 \times 10^{10}$ | $7.99 \times 10^{9}$ | $1.51 \times 10^{9}$ | $3.52 \times 10^{8}$ |
| Modified PVA plus G | $2.70 \times 10^{10}$ | $1.82 \times 10^{10}$ | $1.20 \times 10^{10}$ | $2.44 \times 10^{9}$ | $5.18 \times 10^{8}$ | $2.97 \times 10^{8}$ |

EXAMPLE 3

To 100 parts of a modified polyvinyl alcohol containing 4.7 mol. percent of lauryl vinyl ether was added 20 parts of diethylene glycol (DEG). The mixture was molded through an ordinary extruder with the feed zone kept at 145° C. and the compression and metering zone at 190° C. The dynamic torsional rigidity of the product was $2.52 \times 10^{10}$ dyn./cm.² at −40° C., $1.65 \times 10^{10}$ dyn./cm.² at −20° C., $7.09 \times 10^{9}$ dyn./cm.² at 0° C., $1.159 \times 10^{9}$ dyn./cm.² at 20° C., and $2.92 \times 10^{8}$ dyn./cm.² at 40° C. Thus, the product was more flexible than those obtained according to Examples 1 and 2.

EXAMPLE 4

A modified polyvinyl alcohol containing 5 mol. percent of stearyl vinyl ether in place of lauryl vinyl ether was satisfactorily molded by a conventional extruder with the feed zone kept at 190° C. and the compression and metering zone at 210° C.

EXAMPLE 5

A modified polyvinyl alcohol having a lauryl acetalation degree of 12.6 mol. percent obtained by acetalyzing polyvinyl alcohol with lauryl aldehyde in the presence of a sulfuric acid catalyst was molded by a conventional extruder with the feed zone kept at 180° C. and the compression and metering zone at 200° C. The extrudate obtained had adequate flexibility and resistance to organic solvents.

EXAMPLE 6

To 100 parts of a modified polyvinyl alcohol containing 4.7 mol. percent of lauryl vinyl ether were added 10 parts of calcium carbonate and 20 parts of trimethylol propane. The mixture was successfully extruded through a conventional extruder with the feed zone kept at 155° C. and the compression and metering zone at 210° C.

EXAMPLE 7

A modified polyvinyl alcohol containing 10 mol. percent of octadecene-1 and obtained by the saponification of a copolymer of polyvinyl alcohol and octadecene-1 can be satisfactorily molded by a conventional extruder with the feed zone kept at 190° C. and the compression and meter zone at 210° C.

EXAMPLE 8

The samples obtained in accordance with Examples 2 and 6, and rubbers of various types were immersed in different organic solvents at 40° C. for 48 hours, and their resistances to organic solvents were compared on the basis of weight gains. As shown in Table 3, the results proved that the modified polyvinyl alcohols of the invention are particularly resistant to aromatic hydrocarbons and halogenated hydrocarbons.

TABLE 3.—WEIGHT GAINS ON IMMERSION IN ORGANIC SOLVENTS AT 40° C. FOR 48 HOURS (PERCENT)

| Sample | Organic solvent | | | | |
|---|---|---|---|---|---|
| | Benzene | Monochlorobenzene | Isooctane | High octane gasoline | Carbon tetrachloride |
| Modified PVA plus TMP (Ex. 2) | 5.63 | 9.02 | −1.25 | −0.39 | 8.69 |
| Modified PVA plus TMP plus CaCO₃ (Ex. 8) | 6.65 | 10.6 | −0.4 | 0.3 | 9.06 |
| PVA (saponification degree 99.9 mol. percent) | −0.8 | −0.8 | −0.7 | −0.8 | −0.8 |
| PVA (saponification degree 88.0 mol. percent) | −1.3 | −1.4 | −1.1 | 1.2 | −1.1 |
| Natural rubber | 174.7 | 249.1 | 74.9 | 141.1 | 419.0 |
| Butyl rubber | 63.2 | 104.6 | 51.3 | 81.0 | 182.0 |
| Neoprene | 79.2 | 115.7 | 0.5 | 40.5 | 148.3 |
| Nitrile rubber | 90.7 | 129.4 | 4.3 | 48.9 | 179.0 |
| Superhigh nitrile rubber | 41.0 | 76.4 | −0.4 | 6.3 | 29.0 |
| Hypalon* | 126.8 | 191.6 | 36.0 | 94.5 | 279.2 |
| Silicon rubber | 130.2 | 141.9 | 132.4 | 146.5 | 328.5 |

*DuPont trademark, chloro-sulfonated polyethylene.

The embodiments of the invention in which an exclusive property or privilege is claimed are as follows:

1. A method of producing polyvinyl alcohol moldings which comprises melting polyvinyl alcohol containing 4 to 15 mol percent of alkyl vinyl ether groups the alkyl groups of which contain about 4 to 20 carbon atoms, based on the total number of carbon atoms in the main polymer chain having substituents other than hydrogen, and melt extruding the resulting melt into a shaped product.

References Cited

UNITED STATES PATENTS

| 2,644,807 | 7/1963 | Bloch | 260—73 |
| 2,882,161 | 4/1959 | Dann | 96—114 |
| 2,984,652 | 5/1961 | Jordan et al. | 260—85.7 |

JOSEPH L. SCHOFER, Primary Examiner

S. M. LEVIN, Assistant Examiner

U.S. Cl. X.R.

260—73, 85.7, 87.3